United States Patent Office 3,432,339
Patented Mar. 11, 1969

3,432,339
PROCESS FOR COATING SUBSTRATES WITH POLYMERS
Samuel G. Howell, Cincinnati, Ohio, and Dale M. Akers, Florissant, Mo., assignors to National Distillers and Chemical Corporation, New York, N.Y., a corporation of Virginia
No Drawing. Filed Mar. 3, 1965, Ser. No. 436,929
U.S. Cl. 117—132                                  9 Claims
Int. Cl. B44c 1/08; B44d 1/36

ABSTRACT OF THE DISCLOSURE

A process for coating various substrates with polymers such as polyolefinic polymers alone or in combination with a rubber latex. Finely divided polyolefinic polymers having an average particle size of from about 2 to 30 microns are dispersed in an inert carrier liquid such as water. The resulting dispersion is applied to the surface of the substrate and then heated to evaporate the inert liquid. In accordance with one of the preferred embodiments, a minor amount of a rubber latex is dispersed along with the finely divided polyolefinic polymer.

---

This invention relates to a novel process for applying polyolefinic polymer coatings to various substrates. More particularly, the invention pertains to a process for the formation of polymer coatings utilizing finely divided polyolefin particles dispersed in a suitable liquid.

One of the most widely employed prior art processes for coating various substrates with polyolefinic polymers is extrusion coating. Although this procedure produces good barrier or decorative films, it has a number of series limitations. To begin with, the polymer must be heated to temperatures of 600° F. or higher in order to promote adhesion of the polymer to the substrate; and the use of such elevated temperatures tends to degrade the polyolefinic resin itself. It has also been found that thin coatings applied by extrusion coating do not adhere to the substrate as well as thicker coatings, and that generally the surface of the substrate must be primed if high speed operations are desired. Moreover, in most extrusion coating operations the polyolefinic resin is extruded wider than the substrate followed by a separate trimming step wherein both the polymer coating and the substrate are trimmed back to give an even edge. Such operations obviously result in considerable waste. Another serious problem arises when the extrusion coating line must be shut down for one reason or another. In order to prevent the polymeric resin from degrading in the extruder barrel, the extruder must either be kept running or purged, which also involves resin wastage. Finally, the extrusion coating procedure is useful only for the application of continuous coatings, since the coat of installing apparatus for making stripes and the like is prohibitive.

Another method of applying polyolefin coating is the so-called solution process. In generall, such a procedure involves dissolving the coating resin in a suitable hot solvent, and then applying the resulting solution to a substrate by conventional means such as a roll coater, rod coater, knife coater, etc. The coated surface is then passed through an oven where the solvent is drive off by hot air, radiant heat, or by similar drying means. This method has the advantage of being able to apply coatings from resins of a wide range of molecular weights, and of producing adherent coatings without danger of degrading the polymer. Other advantages include the ability to produce stripes, and the avoidance of resin wastage, since no trimming step is required. The major disadvantages of the solution method are in the large investment required to install and maintain the complex system of resin solution preparation equipment, drying ovens, and solvent recovery system. As is well known, the flammability and/or toxicity of the organic solvents employed in this process require the use of special explosion proof construction and solvent recovery procedures.

One object of the present invention is to provide a novel polymer coating process which avoids the disadvantages encountered in the prior art processes.

Another object of this invention is to provide a method for coating various substrates with polyolefinic polymers which has the advantages of both the extrusion and solution coating methods of the prior art.

A further object of this invention is to provide a method for coating various substrates with polyolefinic polymers having widely varying molecular weights utilizing any one of the conventional wet coating procedures and equipment.

A still further object of this invention is to provide a method for coating various substrates with varying thicknesses of polyolefinic polymers.

Yet another object of this invention is to provide a polymer coating process utilizing finely divided polyethylene dispersed in a carrier liquid.

These and other objects of this invention will become readily apparent from the ensuing description and illustrative embodiments.

In accordance with the present invention, it has now been found that polymeric coatings can readily be accomplished by making a dispersion or suspension of finely divided polyolefinic polymer particles of less than 50 microns in diameter in a carrier liquid, coating the substrate with the thus formed dispersion or suspension, and then applying heat in order to drive off the dispersing liquid and to fuse the polymer particles into a continuous coating. More specifically, the coating dispersion or suspension is prepared by admixing approximately equal parts of water, preferably containing a surface active agent, and finely divided polyolefin powder having an average particle size of about 2 to 30 microns, and preferably having an average particle size within the range of about 5 to 15 microns. The polyolefin powder is thoroughly dispersed in the water by utilizing efficient, conventional stirring equipment. The resulting dispersion is then coated on the surface of the substrate, the temperature of both are then raised above the melting point of the polymer, and the coated substrate is subsequently allowed to cool to ambient temperatures. The present invention also encompasses the use of dispersions having lower or higher concentrations of the finely divided polyolefins. As will be apparent, the concentration of the dispersion will determine the thickness of the continuous polymer coating. Moreover, the dispersing or suspending carrier liquids may also contain viscosity agents for certain commercial applications. Although water is the preferred liquid carrier, other liquids or mixtures of liquids may also be employed.

The finely divided polyolefin dispersion of this invention may be applied to the substrate by the use of such conventional procedures as dipping, brushing, spraying, silk screening, rolling, gravure coating, air knife coating or any one of the numerous methods now in use for applying liquids to surfaces. It is also possible to employ various printing methods such as flexographic or rotagravure in carrying out the coating process of this invention.

As discussed above, various substrates may be coated with the polyolefinic polymers in accordance with the present invention. Such substrates include, for example, paper, cloth, glass, wood, other plastics, metal, cement, paperboard, fibreboard, fibreglass, and the like. Although the present invention will be hereinafter illustrated in connection with the coating of paper, it will be understood that excellent coatings have also been attained with respect to the previously enumerated substrates. The coating may be applied with equal effectiveness to solid or rigid substrates having varying sizes and shapes, and, consequently, there is no intention of limiting the present invention to the coating of flat surfaces.

If desired, the polyolefin may be colored, or pigments, colorants, or other additives may be co-dispersed to obtain special effects such as friction, gloss and the like.

The polyolefinic resins which can be employed in the process of this invention include polyethylene and polypropylene of widely ranging densities and melt indices as well as polyolefinic copolymers such as those prepared from ethylene and vinyl acetate. For many commercial applications, the use of finely divided polyethylene having a density within the range of about 0.910 to 0.925 g./cu. cm., i.e., low density polyethylene, is especially preferred. In general, the coating dispersions of this invention will contain as low as 10% by weight or less to 55% by weight or more of the finely divided polyolefin polymers. A polyolefin solids concentration of from about 10 to 50% by weight is especially preferred for most commercial application. More dilute dispersions are generally more easily prepared from material having a finer particle size. It has been found, however, that little if any advantage is derived by use of dispersions having a very low solids concentration, except in applying very thin coatings, since even a 50% by weight concentration of solids usually has a viscosity of 25 c.p.s. or less and there is added expense involved in evaporating the excess liquid.

The preferred liquid carrier or dispersing liquid is water. Nevertheless, other liquid carriers may also be employed, and such liquids include mineral spirits, toluene, methyl isobutyl ketone, ethanol, ethyl acetate, perchloroethylene, and the like. Although some organic compounds, particularly the aromatic hydrocarbons, tend to swell the finely divided polyolefins resulting in the formation of a viscous mass, this may be desirable under certain circumstances. Since swelling is a time and temperature dependent function, such dispersions should be used immediately after they have been prepared. It will be understood, however, that the preferred carrier of the finely divided polyolefin is one which is inert to and will not attack the fine particles causing swelling and changes in the viscosity of the dispersion. Water is the ideal liquid carrier, but when the speed of the coating operation is critical and where solvent or carrier liquid recovery equipment is already available the aforementioned organic carriers may be employed.

In accordance with another feature of this invention it has also been found advantageous to incorporate a minor amount of a surface active agent in the water to facilitate the formation of the desired finely divided polyolefin dispersion. Illustrative surface active agents include ammonium stearate, an alkyl aryl sulfonate, an alkylphenoxy polyoxyethylene ethanol, an aliphatic polyoxyethylene ether alcohol, and the like. The use of a particular surface active agent is not critical, and it will be understood that any one of the commercially available agents may be used without encountering deleterious results. In general, the amount of the surface active agent employed may vary over a wide range, and for most purposes 0.2% by weight or less of the agent, based on the total weight of the dispersion mixture, has been found sufficient.

Under certain conditions it has been found that the finely divided polyolefin particles may tend to separate from the substrate before they have fused together in the drying step, e.g. in a high velocity air oven, at temperatures of about 250° to 400° F. In accordance with still another feature of this invention, this problem has been readily overcome by adding a minor amount of a latex to the water dispersion. It has been found that as the latex coalesces when the water is being driven off, the particles become bound to one another and to the substrate. Examples of operable latices include styrene-butadiene latex, polyvinylidene chloride latex, acrylic latex, butyl latex, natural rubber and the like. The latex need only be employed in an amount sufficient to promote the desired adhesion of the polyolefin to the substrate. In general, however, the amount of latex may range from about 1 to 10% by weight, and preferably from about 4 to 7% by weight, based on the total weight of the dispersion. In some instances, the use of a latex in the dispersion has the added advantage of helping to improve the resistance of water vapor transmission through the coated substrate. This is demonstrated in the following table wherein the water transmission rate of paper coated in accordance with the teachings of this invention are compared with extrusion polyethylene coated paper.

TABLE

WVTR (gm./100 in.²/24 hrs.) [1]

| | |
|---|---|
| Polyethylene ext. coated (1 mil) paper | 0.14 |
| Polyethylene [2] disp. coated (1 mil) paper: | |
|     Polyethylene | 0.13 |
|     Polyethylene, 5% styrene-butadiene | 0.11 |
|     Polyethylene, 5% acrylic | 0.15 |
|     Polyethylene, 10% acrylic | 0.16 |
|     Polyethylene, 5% Daran [3] | 0.12 |

[1] ASTM 96–53T Procedure A.
[2] Polyethylene has a melt index of 22 and a density of 0.917 gm. per 10 minutes.
[3] A polyvinylidene chloride latex marketed by Dewey and Almy.

The polyethylene dispersion employed to coat the paper in the above comparative runs was prepared by admixing 500 grams of water, containing about 2 grams of an alkylphenoxypolyoxyethylene ethanol (Igepal CO 430) as a surface active agent, with 500 grams of the polyethylene having an average particle size of 8 to 12 microns, and the latex in the amounts set forth, when employed. As shown in the above data, the polyethylene dispersion coated paper had a lower rate of water vapor transmission than the polyethylene extrusion coated paper. The use of minor amounts of styrene-butadiene and Daran latices resulted in further improvements in the resistance to water vapor transmission. The acrylic latex, on the other hand, proved to be somewhat detrimental to the water vapor barrier properties of the polyethylene continuous film coated on the paper substrate. In some instances, it may be desirable to employ water soluble gums as binders in place of the latices, but some increase in dispersion viscosity occurs.

The invention will be more fully understood by reference to the following illustrative embodiments.

EXAMPLE I

A coating dispersion was prepared from 500 grams of water containing 2 grams of a non-ionic surfactant, alkylphenoxypolyoxyethylene ethanol (Igepal CO 430) and 500 grams of polyethylene powder having an average particle size of 8 to 12 microns, a melt index of 22, and a density of 0.17 gm. per 10 minutes. The dispersion is formed by slowly adding the polyolefin powder to the water with continuous stirring, preferably by a high shear stirring device such as a colloid mill, homogenizer, etc. It is also possible to use other methods such as the pasting technique used for preparing animal glues.

The foregoing coating dispersion was applied to a 40 lb. kraft paper by means of a drawdown blade. The clearance of the blade to the paper was adjusted so that after the polymer was fused its thickness was approximately one mil. With the 50% polyethylene solids dispersions employed, the blade clearance was approximately 2 mils. After the paper was coated, it was placed in an oven maintained at a temperature of about 300° F. The polyethylene particles begin to fuse, flowed together, and formed a continuous film coating. Upon testing the adhesion of the resulting polyethylene film to the kraft paper with a Pergins-Southwick bond strength tester, it was found that the adhesion was greater than the strength of the paper, i.e., the paper bursts before the film delaminates from the paper. The water vapor transmission rate of the thus formed polyethylene film, when tested by ASTM Method 96–53T Procedure A, was 0.13 gm./100 in.$^2$/24 hrs. A typical extrusion coated polyethylene film of the same thickness on kraft paper had a water vapor transmission rate of 0.14 when tested under the same conditions. The comparative data on the water vapor transmission rates are set forth in the above table.

EXAMPLE II

The coating dispersion of Example I was applied to kraft paper utilizing a Mayer rod applicator in a continuous wet coating machine. A satisfactory polyethylene film coating resulted.

EXAMPLE III

The coating dispersion of Example I was applied to kraft utilizing a trailing blade coating machine. A satisfactory polyethylene film coating resulted.

EXAMPLE IV

The coating dispersion of Example I was applied to kraft paper utilizing a gravure coating machine. A satisfactory polyethylene film coating resulted.

EXAMPLE V

The coating dispersion of Example I was applied to kraft paper utilizing an air knife coater. An excellent polyethylene coating was achieved at high coating speeds.

EXAMPLE VI

The coating dispersion of Example I was applied to kraft paper utilizing a roll coater in either the forward or reverse directions. A satisfactory polyethylene film coating was obtained at low coating speeds.

EXAMPLE VII

The coating dispersion of Example I was applied to kraft paper utilizing a flexographic coating machine. Satisfactory continuous, discontinuous and patterned coatings of the polyethylene were obtained.

EXAMPLE VIII

The coating dispersion of Example I was applied to kraft paper utilizing a silk screen applicator to achieve a patterned coating, which was higly satisfactory.

EXAMPLE IX

A coating dispersion was prepared by admixing 500 grams of the finely divided polyethylene employed in Example I with 500 grams of mineral spirits, and stirring the resulting admixture at high speed to make a uniform dispersion. An excellent polyethylene coating on kraft paper was obtained when this dispersion was utilized in a continuous web coating machine provided with a Mayer rod applicator.

The above data demonstrate that the coating process of this invention can readily be employed with conventional coating equipment to obtain satisfactory polyolefin coatings. It has also been shown that the pesent process can be employed to prepare continuous, discontinuous or patterned polyolefin coatings. These coatings can be applied without a separate trimming step and with excellent adhesion and improved water vapor transmission resistance. Unless specifically desired, no solvent or organic compound need be employed thereby eliminating the possibility of encountering explosion or toxicity problems.

While particular embodiments of this invention are shown above, it will be understood that the invention is obviously subject to variations and modifications without departing from its broader aspects. Thus, for example, the thickness of the polyolefin coatings may be varied over a wide range with equally good adhesion to the substrate. The coatings of this invention are readily applied by the use of existing equipment as such or after inexpensive changes have been made. It will be further understood that the particular type of coating procedure employed may depend upon the article being coated. For example, a clean metal basket may be coated simply by dipping it into a vat containing the above described coating dispersions followed by heating to effect fusion of the polyolefin polymer and to render the coating adherent to the metal.

What is claimed is:

1. A process for coating a substrate with a polyethylene polymer which comprises dispersing a finely divided polyethylene powder having an average particle size within the range of about 2 to 30 microns and a rubber latex in an inert carrier liquid, said dispersion containing from about 10 to 50% by weight of the finely divided polyethylene polymer and from about 1 to 10% by weight of the rubber latex, applying the resulting dispersion to the surface of a substrate, heating the coated substrate to evaporate the carrier liquid and to fuse the polyethylene polymer to the substrate.

2. The process of claim 1 wherein said polyethylene powder has an average particle size of about 5 to 15 microns.

3. The process of claim 1 wherein said liquid carrier is water.

4. The process of claim 1 wherein said liquid carrier is mineral spirits.

5. The process of claim 1 wherein said substrate is paper.

6. The process of claim 1 wherein said substrate is metal.

7. The process of claim 1 wherein said latex is a styrene-butadiene rubber.

8. The process of claim 1 wherein said latex is polyvinylidene chloride.

9. The process of claim 3 wherein said water contains a minor amount of a surface active agent.

References Cited

UNITED STATES PATENTS

| | | | |
|---|---|---|---|
| 2,628,172 | 2/1953 | Jenett | 117—161 X |
| 2,653,919 | 9/1953 | Hunter | 117—161 X |
| 2,678,285 | 5/1954 | Browning | 117—161 X |
| 2,994,677 | 8/1961 | Bohnert et al. | 260—29.6 X |
| 3,022,263 | 2/1962 | Orthner et al. | 260—29.6 X |
| 3,071,858 | 1/1963 | Alter | 117—132 X |
| 3,123,579 | 3/1964 | Lefevre. | |
| 3,224,094 | 12/1965 | Esemplare. | |
| 3,224,900 | 12/1965 | Creamer et al. | 117—132 X |

WILLIAM D. MARTIN, *Primary Examiner.*

M. LUSIGNAN, *Assistant Examiner.*

U.S. Cl. X.R.

117—38, 97, 155, 161; 260—4, 29.6, 29.7, 889, 897